United States Patent
Reaney

[11] Patent Number: 5,162,149
[45] Date of Patent: Nov. 10, 1992

[54] NON-BLOCKING SEAM TAPE

[75] Inventor: John Reaney, Wilmington, Del.

[73] Assignee: W. L. Gore & Associates, Inc., Newark, Del.

[21] Appl. No.: 523,628

[22] Filed: May 15, 1990

[51] Int. Cl.⁵ .......... B32B 27/00; B32B 3/26; B32B 7/12; B32B 15/04

[52] U.S. Cl. ............ 428/315.5; 428/315.9; 428/351; 428/354; 428/422; 428/346

[58] Field of Search ......... 428/351, 422, 343, 354, 428/315.5, 315.7, 315.9

[56] References Cited

U.S. PATENT DOCUMENTS

| | | | |
|---|---|---|---|
| 3,953,566 | 4/1976 | Gore | 428/422 X |
| 4,096,227 | 6/1978 | Gore | |
| 4,187,590 | 2/1980 | Harris et al. | 411/509 X |
| 4,194,041 | 3/1980 | Gore et al. | 428/422 X |
| 4,532,316 | 7/1985 | Henn | 528/60 X |
| 4,692,369 | 9/1987 | Nomi | 428/422 X |
| 4,775,581 | 10/1988 | Siniscalchi | 428/351 X |
| 4,916,017 | 4/1990 | Nomi et al. | 428/422 X |
| 4,919,999 | 4/1990 | Van Soom | 428/422 X |
| 4,925,732 | 5/1990 | Driskill et al. | 428/422 X |

OTHER PUBLICATIONS

Database WPIL, accession No. 85-046124, 1 page.

Primary Examiner—George F. Lesmes
Assistant Examiner—D. R. Zirker
Attorney, Agent, or Firm—Gary A. Samuels

[57] ABSTRACT

A non-blocking waterproof seam tape for covering sewn seams of garments is taught. The seam tape is comprised of an expanded porous polytetrafluoroethylene layer in which one surface has been densified, a cured or partially cured polyurethane adhesive layer, and a thermoplastic hot melt adhesive layer. The densified surface of the expanded porous polytetrafluoroethylene layer prevents the entry of the thermoplastic adhesive through cold creep into the expanded porous polytetrafluoroethylene layer while the same tape is stored in roll form.

8 Claims, 1 Drawing Sheet

NON-BLOCKING SEAM TAPE

FIELD OF THE INVENTION

This invention relates to a layered tape for sealing sewn seams to prevent entry of water or other liquids through sewn seams. Further, this invention provides a seam tape which does not block and stick to itself in roll form before use.

BACKGROUND OF THE INVENTION

The need to seal sewn seams to provide waterproofness has been known for many years. Early approaches to solve this problem involved the application of rubber solutions in volatile solvents, or adhesively bound strips of rubber to the seams. Later, commercially available synthetic latex dispersions were used for the same purpose with rubberized cloth. Such method are still in use.

With the advent of breathable waterproof fabrics, that is, fabrics which repel liquid water but allow the passage of water vapor, and their use in outer garments, the same problems of seam sealing arose again. Initially, welding the outer fabric was tried instead of sewing. Welding was slow and the seams were generally not as strong as sewn seams and it was found the welded seams were not necessarily waterproof. Later, various pastes in volatile solvents were painted on the seams, but this was messy and the rate of failure at the seams was far too high. Seam sealing tapes were adopted to solve the leakage problem.

To provide a durable waterproof sewn seam, it is necessary to enclose and seal the sewing thread and the ends of the fabric at the seam with a waterproof material. Sealing is accomplished using a thermoplastic hot melt adhesive. It is necessary to ensure that the hot melt adhesive penetrates the fabric all of the way through the fabric to the material which supplies waterproofness and breathability to the garment on both sides of the loose edges of the sewn seam. Seam tape is optionally used on either the lining fabric or shell fabric or directly on the material providing waterproofness.

On the surface of the garment where two seams intersect, it is necessary to have the sealing tape on one seam cross over the sealing tape on the second seam.

The structure of sealing tapes, especially those for use with breathable fabric laminates utilizing expanded porous polytetrafluorethylene membrane as a breathable liquid barrier, usually contain at least two layers; the first layer is most commonly a thermoplastic hot melt adhesive and the second layer is a waterproof layer which can be expanded porous polytetrafluoroethylene or a high melting or non-melting film layer. The film may be any of a number of plastic materials. Optionally, one may also have a third layer of fabric in the seam tape.

The choice of materials for the thermoplastic hot melt adhesive is fairly wide. Thermoplastic films of polyester, polyamides, fluoropolymers and polyurethanes are all used commercially, as hot melt adhesives.

Due to the great difference in melt point, tapes containing an expanded porous polytetrafluoroethylene layer have an advantage of being more dimensionally stable during application than those without said layer. Application of the tape over a seam involves heating the thermoplastic hot melt adhesive, usually in a directed blast of very hot air, up to 800° C., although the tape does not achieve anything like that temperature. High air temperatures are used to accelerate the seam sealing operation and the residence time of the thermoplastic hot melt adhesive exposed at such temperatures is very short. Immediately after being exposed to the hot air, the fabric with the tape over the seam is fed into a compression zone to press the softened thermoplastic hot melt adhesive layer into the fabric. The very nature of the operation induces intermittent motion which, if the tap is not stabilized, i.e. by a layer of expanded porous polytetrafluoroethylene, the tape will tend to stretch and narrow when heated. Without a dimentionally stable expanded porous polytetrafluoroethylene layer, the threads of the fabric have a tendency to push through the tape while in the compression zone and, as a result, initial or long-term waterproofness is sacrificed.

In many cases, it is desirable to use two-layer seam tapes, which are less bulky and produce sealed seams with lower contours. However, two-layer seam tapes manufactured with expanded porous polytetrafluoroethylene films adhered to thermoplastic hot melt adhesive suffer form a distinct blocking problem. That is, when stored under tension in rolls, prior to use, and especially during the hot summer months, the thermoplastic hot melt adhesives tend to cold creep or slowly flow into the pores of the adjacent layer of expanded porous polytetrafluoroethylene creating bonds between the adjacent layers of tape. These bonds formed from the blocking phenomenon can develop strength sufficient to result in destruction of the adhered expanded porous polytetrafluoroethylene layer when the tapes are unrolled and stripped apart. It is to this blocking in storage problem that this invention is addressed.

BRIEF DESCRIPTION OF THE INVENTION

It was found that blocking between the thermoplastic hot melt adhesive layer and the expanded porous polytetrafluoroethylene (PTFE) layer is caused by the compressive pressure required to maintain packaging integrity of the roll of seam tape. During storage, the thermoplastic hot melt adhesive cold flows into the adjacent pores of the expanded porous PTFE.

Use of full density PTFE tape would overcome the blocking problem, but would also eliminate the porosity which provides the desirable feature of aiding the hot melt adhesive in adhering to the PTFE. Furthermore, it si difficult to adhere to full density PTFE. Manufacture of a layered tape including full density PTFE would require chemical etching of the PTFE surface.

To resolve the blocking problem without etching, expanded porous PTFE is first coated with a thermosetting adhesive. Some of the thermosetting adhesive penetrates into the pores of the expanded porous PTFE layer on the side that the thermosetting adhesive is applied. The thermosetting adhesive is cured or partially cured. The coated tape is then heated and compressed on one side in order to eliminate remaining pores and to densify the expanded porous PTFE layer to reduce pore volume. This results in a cured or partially cured thermosetting adhesive on one surface to which the thermoplastic hot melt adhesive layer is bonded.

The other surface of the expanded porous PTFE layer has been compressed to a greater density. The thermoplastic hot melt adhesive is applied to the side that contains the cured or partially cured thermosetting adhesive. The resulting tape has excellent dimensional stability at elevated temperatures, is supple and does not block in the roll during warm weather storage.

DETAILED DESCRIPTION OF THE INVENTION

Figure 1:
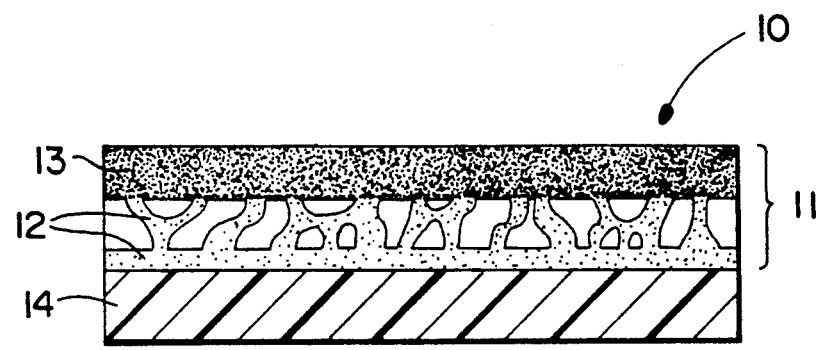
FIG. 1 depicts a seam tape (10) of this invention. The seam tape comprises expanded porous PTFE layer (11), which has pores that are filled with a cured or partially cured thermosetting adhesive (12) on one side. On the other side (13), the expanded porous PTFE layer is essentially full density as a result of compression of the pores on that side. Bonded to cured or partially cured thermosetting adhesive (12) is a layer of thermoplastic hot melt adhesive (14).
Figure 2:
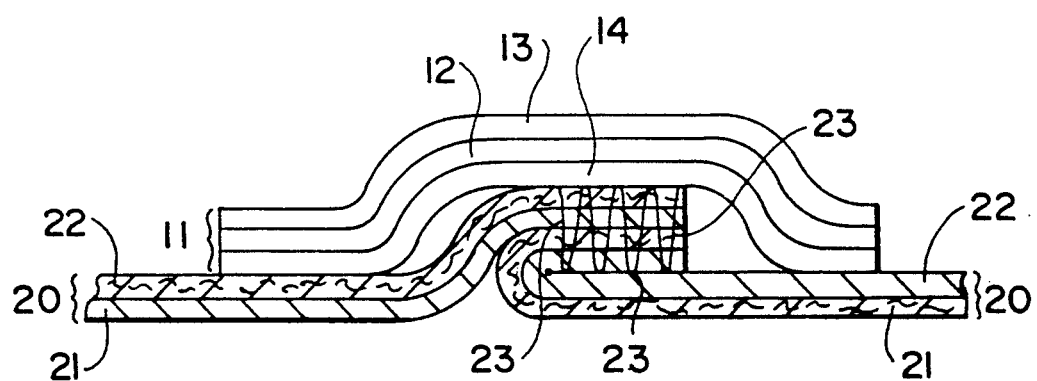
In FIG. 2, fabric material (20) is composed of a waterproof breathable material (21) laminated to a fibrous backing (22). Fabric materials (20) are stitched together by thread (23). The seam is covered by the seam tape described in FIG. 1 where (11), (12), (13), and (14) are all as described in FIG. 1.

The problem of blocking of seam tape containing an expanded porous PTFE layer during storage, especially in warm months, has plagued the breathable waterproof garment industry for a number of years. It is necessary to wrap the seam tapes tightly to maintain integrity on the spool, but compressive forces, combined with some warmth, induce the thermoplastic hot melt adhesive to creep into the pores of the adjacent layer of expanded porous PTFE layer, thus, adhering adjacent layers of seam tape together strongly enough that upon unrolling the spool, the expanded porous PTFE layer is damaged.

Simply densifying expanded porous PTFE films or tapes (as described in U.S. Pat. No. 3,953,566) provides a product with desired strength properties in which the pores of the expanded material are closed sufficiently to prevent the ingress of the thermoplastic hot melt adhesive during storage, and, thus, prevent blocking. However, the pores serve to aid in bonding the thermosetting adhesive to the polytetrafluoroethylene. The only alternative is to provide "tooth" for the adhesive by chemically etching one surface.

To circumvent the blocking problems without stretching, the expanded porous polytetrafluoroethylene membrane is first coated with a thermosetting adhesive. The thermosetting adhesive penetrates into the surface pores on one side of the expanded porous PTFE layer and upon solidifying and curing provides an adhesive layer to which the thermoplastic hot melt adhesive may be adhered. The coated expanded porous PTFE tape or membrane is then densified using pressure and heat. The densified expanded porous PTFE tape or membrane surface has reduced pore volume on one side, but the side coated with cured or partially cured thermosetting adhesive readily bonds with the thermoplastic hot melt adhesive, thus, providing a strong, flexible, seam tape that no longer blocks while in rolls.

The expanded porous PTFE layer used in this invention is in the form of a film prepared according to the teachings of U.S. Pat. No. 3,953,566 and U.S. Pat. No. 4,187,590. The films, prior to densification have densities between 0.3 g/cc. and 0.6 g/cc., preferably between 0.3 g/cc. and 0.5 g/cc. Said films are between 1.0 mils and 2.5 mils thick, preferably between 1.0 mils and 2.0 mils. All said films have porosities of 40% or greater.

The thermosetting adhesive is used to coat the expanded porous PTFE layer need, after curing or partial curing, to form strong bonds with the thermoplastic hot melt adhesive layer as well as with the expanded porous PTFE layer. Further, as the thermosetting adhesive must have a sufficiently low viscosity as a liquid to flow into the pores of the expanded porous PTFE and when cured or partially cured must melt well above the melting point of the thermoplastic hot melt adhesive layer to prevent delamination. Materials with melt viscosities between 500 cps. and 50,000 cps. or preferably 1000 cps. to 20,000 cps. at 100° C. are required. Preferably, the melting point of the cured or partially cured thermosetting adhesive is in excess of 200° C. More preferably, the thermosetting adhesive does not melt, but decomposes. Moreover, in the solid form, it must be insoluble in water in all cases, and, in some, should be uneffected by dry cleaning solvents.

Thermosetting adhesives which are useful are essentially linear and may be cured with added curing agents or with atmospherically borne moisture. The most preferred thermosetting adhesives are described in U.S. Pat. No. 4,532,316.

Densification of the coated expanded porous PTFE layer is accomplished with heat and pressure which ar applied between one hot metal roll and a resilient roll, the uncoated surface of the expanded porous PTFE layer being in contact with the hot metal roll. The hot roll temperature is between 200° C. and 400° C., preferably between 250° DC. and 350° C. and the nip pressure is above 50 psi, preferably above 150 psi.

The density of expanded porous PTFE layer in the densified coated expanded porous PTFE layer is determined by ASTM-D-1622-83, the Standard Test Method for Apparent Density of Rigid Cellular Plastics using cross sectional scanning electron micrographs to provide the thickness of the cured or partially cured thermosetting adhesive. Thickness of the cured or partially cured thermosetting adhesive was subtracted from the overall thickness to yield an expanded porous PTFE layer thickness. The ratio of expanded porous PTFE layer thickness after densification to expanded porous PTFE layer thickness before densification was multiplied by the predensification density to yield a post-densification expanded porous PTFE layer density. The original expanded porous PTFE layer density was determined using length, width, thickness and bulk weight measurements of the expanded porous PTFE layer roll prior to coating.

After the densification process, a thermoplastic hot melt adhesive layer is applied to the cured or partially cured thermosetting adhesive. The thermoplastic hot melt may be applied using various methods including adhering previously cast films of thermoplastic hot melt adhesive and the slot coating of molten thermoplastic hot melt adhesive onto the cured or partially cured thermosetting adhesive.

The thermoplastic hot melt adhesive is preferably a polyurethane. It should melt below 250° C., preferably below 200° C. and even more preferably below 180° C., but in all cases above 100° C. The thermoplastic hot melt adhesive should have a melt flow rate (as determined by ASTM 1238 under conditions K155/15) of greater than 10g./min. and less than 200g./min.; the preferred range for the melt flow index is greater than 20g./min. and less than 150g./min. to ensure adequate flow of the thermoplastic hot melt layer when applied to a seam.

The thermoplastic hot melt polyurethane adhesive layer should be between 1 mil and 8 mils thick. The thickness required in the thermoplastic hot melt adhesive layer is determined by the thickness of the fabric through which the molten adhesive must flow to form a bond and seal with the material in the structure being sealed which provides the waterproofing properties. In many waterproof and breathable structures that waterproofing material is expanded porous PTFE layer.

The sealing tapes of this invention were tested for blocking by a modification of ASTM-D-1145, the Standard Test Method for Blocking Point of Potential Adhesive Layers.

Blocking Test

ASTM-D-1146-88, Standard Test Method for Blocking Point of Potentially Adhesive Layers was modified to provide and accelerated version of what happens in rolls of seam tape during summer storage. Two nine-inch long samples of ⅜ inch seam tapes were placed one on the other with the thermoplastic hot melt adhesive in contact with the expanded porous PTFE layer. The samples were stored between the heated plates (40° C.) of a Carver press for 14 days while under a pressure of 50 psig. The samples were removed, allowed to come to room temperature and examined for blocking, using the criteria described in ASTM-D1146-88.

EXAMPLE

A expanded porous PTFE membrane coated with a thermosetting adhesive, more particularly a polyurethane prepolymer such as described in U.S. Pat. No. 4,194,041 was densified on the side opposite the thermosetting adhesive by feeding (in roll form) from a mechanically driven unwind station to and through a mechanically driven hot nip (heated metal roll in contact with a rubber coated roll) to perform the densification. The layer of expanded porous PTFE was in contact with the heated metal roll while the layer of cured or partially cured thermosetting adhesive was in contact with the rubber roll. Temperature of the metal roll, nip pressure and speed remained constant throughout each example but may have varied for different examples (see Table 1: Summary of Results).

After densification, the expanded porous PTFE layer was cooled by contact with a mechanically driven metal roll that had cool water circulated through it. The cooled expanded porous PTFE layer was then returned to roll form by a mechanically driven rewind station.

The densified expanded porous PTFE layer was subsequently coated with a thermoplastic hot melt adhesive applied to the cured or partially cured thermosetting adhesive.

In Runs A and B, thermoplastic hot melt adhesive was a polyurethane applied as a 6 mil thick film with a release paper backing. The thermoplastic hot melt adhesive film was adhered to the cured or partially cured thermosetting adhesive through the use of a hot nip process similar to the densification process but at much lower temperatures and pressures. The resulting layered product was cooled and rewound into a roll form. The roll was subsequently slit to a desired width.

In Run C, the thermoplastic hot melt adhesive was applied to the side of the film containing the cured or partially cured thermosetting adhesive through the use of a slot coating process. The resulting layered product was cooled, rewound, and slit to a desired width.

Expanded porous PTFE membranes that had not been densified were used as controls for this experiment.

The results of the blocking tests show a difference between the densified expanded porous PTFE seam tapes and the control expanded porous PTFE seam tapes. In all cases, the control seam tape displayed enough blocking to damage the expanded porous PTFE layer when peeled apart. This degree of blocking renders the seam tape useless. By densifying the expanded porous PTFE, the blocking tendency is reduced. Under conditions were the control tape's PTFE layer is damaged when peeled apart, the densified expanded porous PTFE seam tape displays no damage to the expanded porous PTFE layer and in some cases, no blocking at all.

TABLE 1
SUMMARY OF RESULTS

| I.D. | Nip Pressure (psi) | Hot Roll Temp. (C.) | Speed (fpm) | EPTFE Density (g/cc) | Degree of Blocking* |
|---|---|---|---|---|---|
| Run A | 95 | 315 | 240 | 0.68 | Non to Slight |
| Control A | — | — | — | 0.36 | Severe |
| Run B | 190 | 300 | 80 | 0.87 | None |
| Control B | — | — | — | 0.37 | Severe |
| Run C | 190 | 300 | 50 | 0.94 | Slight |
| Control C | — | — | — | 0.46 | Moderate to Severe |

*Degrees of Blocking:
None-layers readily fall apart
Slight-layers peel apart with minimal force
Moderate (first degree)-obvious adherence when peeling apart layers but no damage to either surface.
Severe (second degree)-obvious adherence when peeling apart layers and damage to at least one surface.

What I claim is:

1. A tape for sealing sewn seams against liquid entry comprising:
   (a) a layer of thermoplastic hot melt adhesive joined to,
   (b) a layer of expanded porous polytetrafluoroethylne which has:
      (i) one side coated with and the pores on that side partially filled by an essentially linear thermosetting adhesive having a sufficiently low viscosity as a liquid to flow into the pores of the expanded porous polytetrafluoroethylene and when cured or partially cured having a melting point above the melting point of the thermoplastic hot melt adhesive layer and being insoluble in water and,
      (ii) the other side being unfilled and uncoated and densified to a higher density.

2. The tape of claim 1 wherein the thermosetting adhesive is a polyurethane.

3. The tape of claim 1 wherein the thermosetting adhesive is a curable polyurethane adhesive applied as a liquid prepolymer and allowed to moisture cure.

4. The tape of claim 1 wherein the densified portion of the expanded porous polytetrafluoroethylene layer has a density between 0.8 and 1.8 g./cc.

5. The tape of claim 1 wherein the thermoplastic hot melt adhesive is a polyurethane.

6. The tape of claim 4 wherein the thermoplastic hot melt polyurethane has a melting point between 100° C. and 250° C.

7. The tape of claim 4 wherein the thermoplastic hot melt polyurethane has a melting point between 120° C. and 180° C.

8. The tape of claim 1 wherein the thermosetting adhesive is insoluble in dry-cleaning solvents.

* * * * *